Sept. 7, 1948.  H. E. THROSEL  2,448,844
ENGINE STARTING DEVICE
Filed Feb. 28, 1947  2 Sheets-Sheet 1

Inventor
HARRY E. THROSEL,
By McMorrow, Berman & Davidson
Attorneys

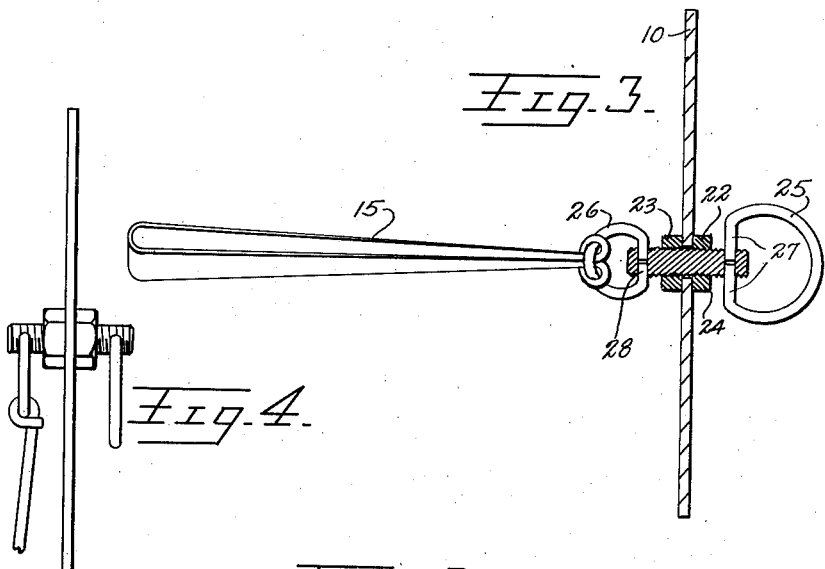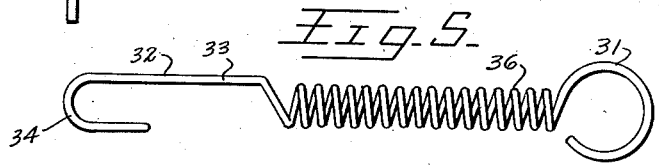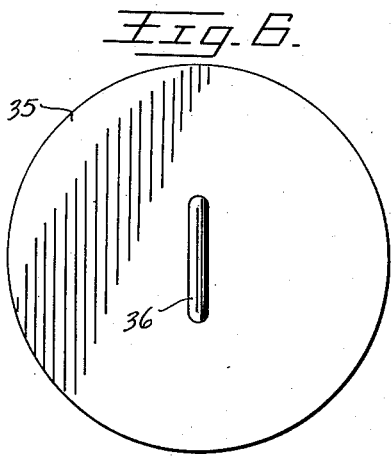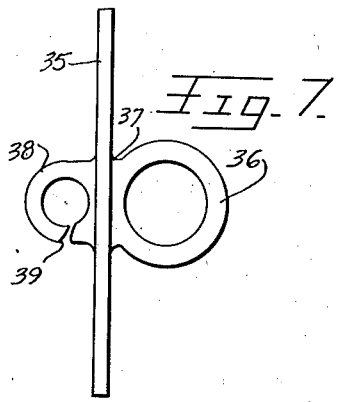

Patented Sept. 7, 1948

2,448,844

UNITED STATES PATENT OFFICE 2,448,844

ENGINE STARTING DEVICE

Harry E. Throsel, Waukegan, Ill.

Application February 28, 1947, Serial No. 731,486

10 Claims. (Cl. 123—185)

1

This invention relates to improvements in engine starting devices and particularly to an improved device for starting miniature engines such as are commonly used to propel miniature or model aircraft.

Several attempts have been made to provide means for conveniently starting miniature aircraft engines, the most common device employed being a wound cord. It has also been proposed to use a gear and gear sector starting device with manually operable actuating levers. Both of these methods require the permanent installation on the power plant of the miniature aircraft of a permanent weight increasing fixture such as a spool for the cord to be wound on or the gear and sector mechanism referred to. Such permanently attached weight increasing components are highly undesirable for model or miniature aircraft and the previously proposed devices have also been unduly expensive and inconvenient to use. The result has been that such miniature engines are usually started by rotation of the propeller by hand. This been found to involve considerable danger to the hands of the person attempting to start the engine and is frequently ineffective for the reason that the propeller cannot be turned quickly enough through the explosion cycle of the engine to insure starting of the engine.

It is an object of the present invention to provide an improved starting device for miniature aircraft engines which device does not require a permanent attachment to the engine or aircraft of any weight increasing component, which involves no danger of personal injury to a person starting the engine, which is effective to turn the engine through its explosion cycle with sufficient rapidity to insure starting of the engine, which is light in weight and convenient to carry, and which is simple and inexpensive to manufacture.

Figure 1:
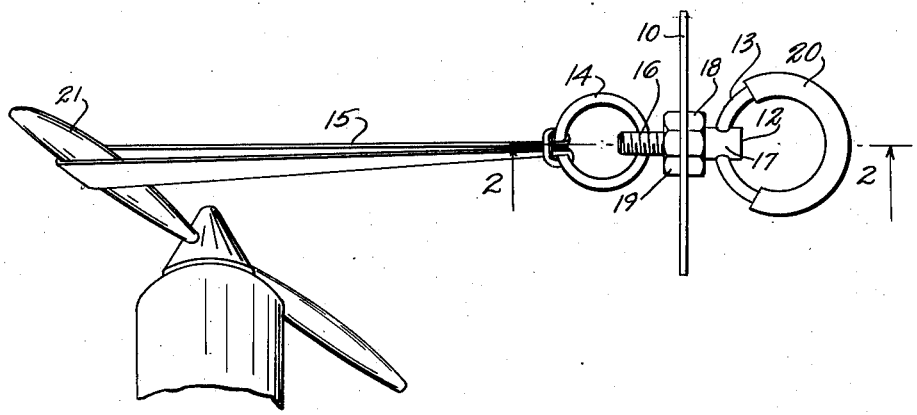
Figure 2:
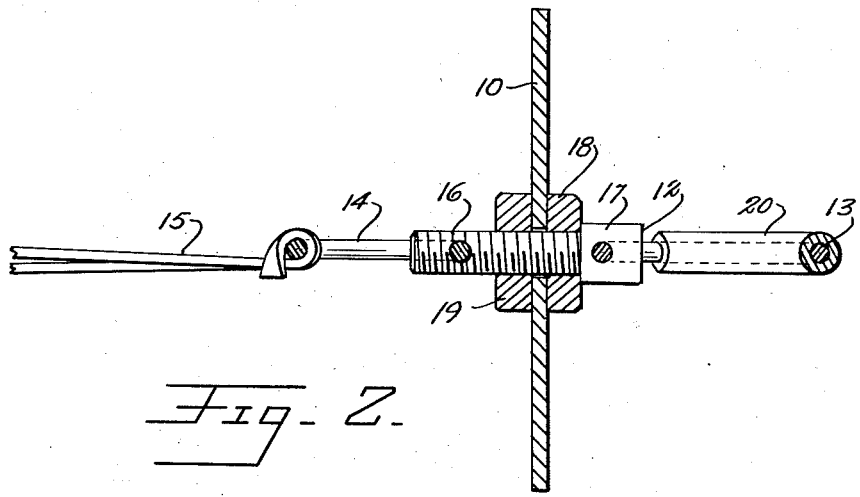

Other objects and advantages will be apparent from a consideration of the following description in conjunction with the accompanying drawings wherein:

Fig. 1 is an elevational view of an engine starting device illustrative of the invention showing the manner in which the device is used to start the engine of a miniature or model aircraft;

Fig. 2, a longitudinal sectional view on a somewhat enlarged scale on the line 2—2 of Fig. 1;

Fig. 3, a view similar to Fig. 2 showing a somewhat modified form of the device of the invention wherein certain of the components are pivoted in order to render the device collapsible for convenient transportation;

Fig. 4, an elevational view of the modified form of the device shown in Fig. 3 showing the device in collapsed condition;

Fig. 5, an elevational view of a modified resilient element for the engine starting device;

Fig. 6, an end elevational view of a still further modified form of the device of the invention; and, Fig. 7, a side elevational view of the modified form shown in Fig. 6.

With continued reference to the drawings and particularly to Figs. 1 and 2, the improved engine starting device comprises a guard or shield 10 in the form of an apertured disk shaped plate through which extends a stem 12 having secured to the opposite ends thereof rings 13 and 14 and a flexible element in the form of a rubber band 15 secured at one end to one of the rings.

The stem 12 is externally screw threaded over a portion of the length thereof, as indicated at 16, and is provided beyond the screw threads with a cylindrical head portion 17 provided with a transverse aperture. A nut 18 is threaded on to the threaded portion of the stem until it bears against a shoulder provided by a head 17 at the termination of the threaded portion 16, the guard 10 is placed upon the stem in position to bear against the nut 18 and a second nut 19 is threaded upon the stem to bear against the guard 10. The guard 10 is thus held in operative position on the stem by the clamping action of the nuts 18 and 19 disposed one at each side thereof.

The ring 13 is secured to the stem 12 by having a portion thereof pass through the aperture in the head portion of the stem and a portion of this ring is preferably covered by a suitable grip member 20 which may conveniently be formed from a piece of tubing of rubber or similar material into which the ring is inserted before it it secured to the stem 12.

The ring 14 is secured to the stem by passing a portion of the ring through an aperture provided in the screw threaded portions of the stem after the guard plate 10 and the nuts 18 and 19 are properly positioned on the stem. The flexible member 15 may be secured to the ring 14 by looping one end of this member about the ring, as is clearly illustrated in Fig. 1.

In order to start the engine of a miniature model airplane the free end of the flexible band 15 is looped over one blade 21 of the propeller, the propeller is held against rotation by one hand of the person starting the engine while, with the other hand engaging the ring 13, the starting device is moved away from the propeller blade until the flexible band 15 is stretched. The propeller blade 21 is then quickly released and the flexible band 15 in contracting will quickly snap the propeller blade around and turn the engine through its explosion cycle with sufficient rapidity to start the engine. As soon as the propeller blade 21 has been turned through a portion of a revolution sufficient to start the engine the band 15 slips off of the blade and the device does not in any way interfere with rotation of the propeller after the engine has been started. The guard 10 protects the hand of the person starting the engine against the snap or sting of the rubber band when it is released from the propeller blade and, since it is ncessary only to hold the blade 21 against rotation while the band is being stretched and release of the blade moves the hand out of the path of the propeller blade, there is no danger of personal injury to a person starting an engine with this device.

In the modified arrangement shown in Figs. 3 and 4 the guard plate 10 may be similar to the guard plate shown in Figs. 1 and 2 and may be in the form of an apertured disc of suitable thin metal, cardboard, wood or other suitable material, and the flexible member 15 may also be similar to the flexible member of Figs. 1 and 2 and may comprise a rubber band of sufficient strength to start the engine. In this modified arrangement, however, a simplified stem member 22 is used and may conveniently comprise a cylindrical metal rod externally screw threaded throughout its length and provided adjacent its ends with transverse apertures. Suitable nuts 23 and 24 are screw threaded on to the stem 22 to clamp the guard plate 10 in position on the stem and rings 25 and 26 are secured to the stem by having portions thereof pass through the transverse apertures provided in the stem. In this arrangement the portion of the ring 25 passing through the corresponding aperture in the stem 22 is straightened or flattened as indicated at 27 and the portion of the ring 26 passing through the corresponding transverse aperture is similarly straightened or flattened as indicated at 28. This construction renders the rings 25 and 26 rotatable in the apertures in the stem so that these rings can readily be moved between the extended or operative position shown in Fig. 3 to a collapsed position, as illustrated in Fig. 4, in which they lie along the opposite sides of the guard member 10. With the device in the collapsed condition, as shown in Fig. 4, it can easily be carried in the pocket of a person desiring to use it.

Fig. 5 illustrates a modified form of flexible member comprising a coiled spring 30 which may be conveniently formed of comparatively small gauged spring wire. At one end the spring is provided with a hook 31 which may conveniently be of substantially circular form for engagement with a ring, such as the ring 14 of Fig. 1 or the ring 26 of Fig. 3, and that the opposite end is provided with a hook 32 having an elongated side 33 extending from the spring and a hooked portion 34 of a shape to conveniently engage the propeller blade 21.

The modified arrangement shown in Figs. 6 and 7 is particularly adapted to a simplified construction using non-metallic materials such as wood or synthetic resin plastic. In this arrangement a guard disc 35 has attached to one side thereof a continuous ring 36 which is secured to the disc substantially at the center thereof either by being molded integrally with the disc or by being cemented thereto, as indicated at 37. A somewhat smaller ring 38 having an opening 39 therein is secured to the opposite side of the disc by being molded integrally with the disc or cemented thereto.

If desired, the two rings 36 and 38 may be formed as a single integral member and the device may be assembled by passing the smaller ring 38 through an elongated aperture or slot in the disc and then cementing the integral ring member in proper positions in the disc.

There is thus provided a simple and inexpensive starting device for miniature engines which protects a persons starting such an engine against danger of personal injury, which is effective to rotate the engine through its starting cycle with sufficient rapidity to insure starting of the engine, and which may be conveniently carried on the person of an owner or operator of a model aircraft having a miniature engine power plant.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

I claim:

1. An engine starting device comprising two ring members secured together; a guard member secured in operative position between said ring members; and a flexible member secured at one end to one of said ring members and having its other end arranged to engage a blade of a propeller driven by a miniature propeller driving engine.

2. Means for starting a miniature propeller driving engine comprising a resilient stretchable element adapted to loop or hook over a propeller blade; a member providing a hand grip for stretching said resilient element; a ring secured to said member providing means for attaching said flexible element to said hand grip member; and a guard member secured in position between said hand grip member and said ring.

3. A starting device for a miniature propeller driving engine comprising an elongated looped member of flexible material; a ring attached to one end of said member; a threaded stem attached to said ring; a disc shaped guard member positioned on said stem; a pair of nuts threaded onto said stem one at each side of said guard member to hold said guard member in operative position on said stem; and a second ring secured to said stem at the opposite side of said guard member from said first mentioned ring.

4. A starting device for a miniature propeller driving engine comprising an elongated member of flexible material engageable with a propeller blade; an externally screw threaded stem; an apertured guard member positioned on said stem; a pair of nuts threaded onto said stem and disposed one at each side of said guard member to maintain said guard member in operative position on said stem; a ring pivotally secured to one end of said stem by having a portion thereof passing through a transverse aperture in said stem, said ring being attached to one end of said stretchable member; and a second ring pivotally secured to said stem by having a portion thereof passing through a transverse aperture in said stem adjacent the opposite end thereof, said ring providing a hand grip for stretching said stretchable member.

5. A starting device for a miniature propeller driving engine comprising an elongated stretchable member of flexible material arranged to engage a propeller blade; a ring attached to one end of said member; a threaded stem having a head portion at one end thereof and external screw threads extending from said head portions to the other end thereof attached to said ring; an apertured disc shaped guard member positioned on said stem; means including a nut screw threaded on said stem holding said guard member in operative position on said stem; and a second ring secured to the head portion on said stem providing a hand grip member for stretching said stretchable member.

6. A starting device for a miniature propeller driving engine comprising a coiled spring member having a ring at one end thereof and an elongated hook at the opposite end thereof; a guard member; means at one side of said guard member connecting said spring ring to said guard member; and means at the opposite side of said guard member providing a hand grip for stretching said spring.

7. A starting device for a miniature propeller driving engine comprising a coiled tension spring having an elongated hook at one end thereof shaped to engage a propeller blade and a loop at the opposite end thereof; a ring providing a hand grip for stretching said spring; means engageable with the loop at said one end of said spring connecting said ring to said spring; and a guard plate carried by said connecting means between said ring and said spring to protect the hand of a person operating said starting device from injury by said spring.

8. A starting device for a miniature propeller driving engine comprising an elongated stretchable member of flexible material arranged to engage a propeller blade; a guard member; two rings secured one to each side of said guard member, one of said rings being connectible to an end of said stretchable member and the other of said rings providing a hand grip for stretching said stretchable member.

9. A starting device for a miniature propeller driving engine comprising an elongated stretchable member of resilient material; a disc shape guard member having an elongated aperture therethrough; a stem member having two ringed portions secured in said aperture with one of said ringed portions at each side of said guard member, said stretchable member being connected to one of said ring portions and the other of said ring portions providing a hand grip for stretching said stretchable member.

10. A starting device for a miniature propeller driving engine comprising a stretchable member of resilient material engageable with a propeller blade; a guard disc; means connecting said stretchable member to said guard disc at one side thereof; and means providing a hand grip disposed at the opposite side of said guard disc and connected to said means connected with said stretchable member.

HARRY E. THROSEL.

REFERENCES CITED

The following references are of record in the file of this patent:

UNITED STATES PATENTS

| Number | Name | Date |
| --- | --- | --- |
| 2,385,963 | Beard | Oct. 2, 1945 |